United States Patent
Childers et al.

(10) Patent No.: US 8,485,735 B2
(45) Date of Patent: Jul. 16, 2013

(54) FIELD INSTALL FIBER CLIP AND METHOD OF USE

(75) Inventors: Darrell R. Childers, Hickory, NC (US); Joseph P. Howard, Hickory, NC (US); Myron Yount, Conover, NC (US)

(73) Assignee: US Conec, Ltd, Hickory, NC (US)

( * ) Notice: Subject to any disclaimer, the term of this patent is extended or adjusted under 35 U.S.C. 154(b) by 420 days.

(21) Appl. No.: 12/642,767

(22) Filed: Dec. 18, 2009

(65) Prior Publication Data

US 2010/0202735 A1     Aug. 12, 2010

Related U.S. Application Data

(60) Provisional application No. 61/139,535, filed on Dec. 19, 2008.

(51) Int. Cl.
*G02B 6/36* (2006.01)

(52) U.S. Cl.
USPC .................................. 385/53; 29/464

(58) Field of Classification Search
USPC ................. 385/53–94; 29/464–469.5
See application file for complete search history.

(56) References Cited

U.S. PATENT DOCUMENTS

| | | | | |
|---|---|---|---|---|
| 3,772,119 A * | 11/1973 | Peck | ............................ | 156/173 |
| 4,096,010 A * | 6/1978 | Parham et al. | ................. | 156/179 |
| 4,265,514 A * | 5/1981 | Wellington et al. | ............. | 385/65 |
| 4,629,284 A * | 12/1986 | Malavieille | ..................... | 385/70 |
| 4,720,165 A * | 1/1988 | Tokuda et al. | ................. | 156/166 |
| 4,980,007 A * | 12/1990 | Ferguson | ....................... | 156/179 |
| 5,013,345 A * | 5/1991 | Itoh et al. | ......................... | 65/407 |
| 5,046,813 A * | 9/1991 | Itoh et al. | ......................... | 385/96 |
| 5,076,881 A * | 12/1991 | Ferguson | ....................... | 156/436 |
| 5,170,456 A * | 12/1992 | Itoh et al. | ......................... | 385/96 |
| 5,216,741 A * | 6/1993 | Blijleven et al. | .............. | 385/137 |
| 5,323,481 A * | 6/1994 | Tokumaru et al. | ............. | 385/136 |
| 5,446,815 A * | 8/1995 | Ota et al. | ......................... | 385/33 |
| 5,586,211 A * | 12/1996 | Dumitrou et al. | ............. | 385/135 |
| 5,600,747 A * | 2/1997 | Yamakawa et al. | ............. | 385/59 |
| 5,695,540 A * | 12/1997 | Suganuma et al. | ............. | 65/378 |
| 5,810,968 A * | 9/1998 | Dannoux | ....................... | 156/580 |
| 5,812,726 A * | 9/1998 | Jinnai et al. | .................... | 385/137 |
| 6,004,042 A * | 12/1999 | Million et al. | ................... | 385/59 |
| 6,033,124 A * | 3/2000 | Lesueur et al. | ................. | 385/53 |
| 6,072,932 A * | 6/2000 | Bennett et al. | ................. | 385/139 |
| 6,089,759 A * | 7/2000 | Kawamura et al. | ............. | 385/78 |
| 6,161,278 A * | 12/2000 | Easter et al. | ..................... | 29/749 |
| 6,305,850 B1 * | 10/2001 | Luther et al. | .................... | 385/78 |
| 6,421,493 B1 * | 7/2002 | Burek et al. | .................... | 385/134 |
| 6,553,173 B1 * | 4/2003 | Goto | ............................. | 385/137 |

(Continued)

FOREIGN PATENT DOCUMENTS

| JP | 05257037 A | * | 10/1993 |
|---|---|---|---|
| JP | 09159871 A | * | 6/1997 |
| JP | 10020126 A | * | 1/1998 |
| JP | 2003307650 A | * | 10/2003 |

*Primary Examiner* — Charlie Peng
*Assistant Examiner* — Peter Radkowski
(74) *Attorney, Agent, or Firm* — Michael L. Leetzow, P.A.

(57) ABSTRACT

A clip holds a plurality of optical fibers in an array to be inserted into a fiber optic ferrule. The clip has a base member and a lid to hold the optical fibers therebetween. A stacker block assists in making the array by aligning them in a single plane. The optical fibers are then held in alignment for stripping, cleaving and inserting into the fiber optic ferrule.

19 Claims, 8 Drawing Sheets

U.S. PATENT DOCUMENTS

| | | | |
|---|---|---|---|
| 6,655,433 B1 * | 12/2003 | Hirayama et al. | 156/436 |
| 6,744,955 B2 * | 6/2004 | Nechitailo et al. | 385/114 |
| 6,944,379 B2 * | 9/2005 | Olbricht et al. | 385/115 |
| 6,971,803 B2 * | 12/2005 | Mudd et al. | 385/71 |
| 6,973,242 B2 * | 12/2005 | Yang et al. | 385/52 |
| 7,407,333 B2 * | 8/2008 | Horino et al. | 385/98 |
| 2002/0129623 A1 * | 9/2002 | Nonomura et al. | 65/385 |
| 2003/0012518 A1 * | 1/2003 | Tomaru et al. | 385/76 |
| 2004/0170362 A1 * | 9/2004 | Engstrand | 385/90 |
| 2004/0175091 A1 * | 9/2004 | Nonomura et al. | 385/137 |
| 2005/0135754 A1 * | 6/2005 | Chiang | 385/78 |
| 2005/0135755 A1 * | 6/2005 | Kiani et al. | 385/78 |
| 2008/0101751 A1 * | 5/2008 | Luther et al. | 385/59 |
| 2009/0238522 A1 * | 9/2009 | Kachmar | 385/78 |
| 2010/0111478 A1 * | 5/2010 | Fujiyama | 385/77 |

* cited by examiner

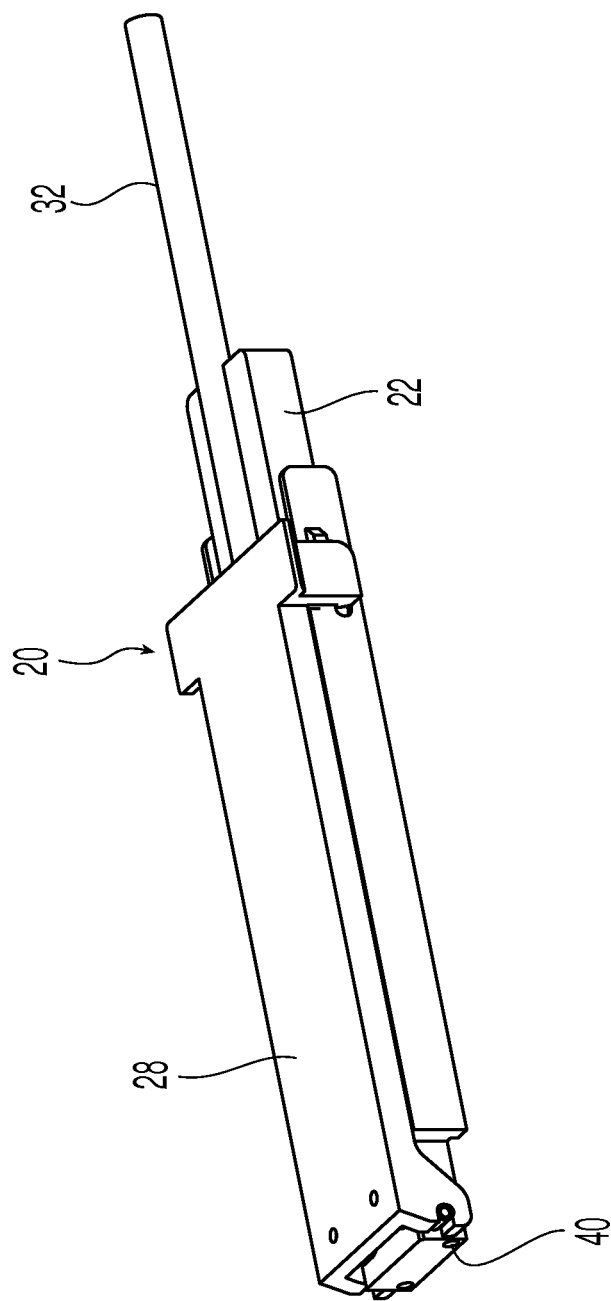
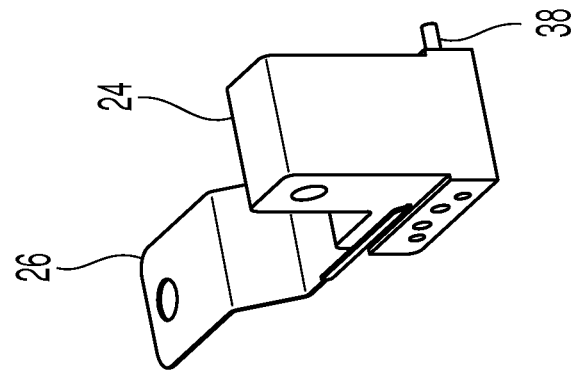
Fig. 4

FIELD INSTALL FIBER CLIP AND METHOD OF USE

REFERENCE TO RELATED CASE

This application claims priority under 35 U.S.C. §119 (e) to provisional application No. 61/139,535, filed on Dec. 19, 2008, which is hereby incorporated by reference in its entirety.

BACKGROUND OF THE INVENTION

Field of the Invention

The field installable MT ferrule requires fibers be inserted into the back of the ferrule that have been cleaved and stripped. To hold the loose fibers in position for cleaving and stripping, a clamping device was desired that could fit into both a cleaver and stripper and also fit into a field install ferrule assembly tool.

SUMMARY OF THE INVENTION

The present invention is directed to a clip that includes a base and a lid that is rotatably connected to one another to capture optical fibers therebetween, a stacker block having a slot therein to accept loose optical fibers, a stacker tool to compress the optical fibers in the slot, and an elastic member disposed on the lid to secure the optical fibers in the clip for further processing. By aligning the optical fibers in the clip to form a temporary ribbon, the optical fibers can be fed into a ferrule. Due to the ability of the clip to maintain the location of the optical fibers, the process of ribbonizing the fiber with either tape and/or adhesive is avoided.

In some embodiments, the stacker block is removably attached to the base.

In some embodiments, the lid and base are configured to fit into a stripping and cleaving device.

In another aspect, the invention is directed to a method of installing loose optical fibers into an MT ferrule without ribbonizing the optical fibers first that includes the steps of disposing a connector spring over the optical fibers, placing the optical fibers and spring into a clip base, arranging ends of the optical fibers into a slot in a stacker block attached to the clip base, compressing the optical fibers in the slot, securing a lid to the base and closing the lid over the optical fibers and spring, removing the stacker block from the base, stripping the optical fibers while in the clip, cleaving the optical fibers, and securing the optical fibers into an optical ferrule.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 4 is a top perspective view of the fiber clip in a closed position and separated from the stacker block;

DETAILED DESCRIPTION OF THE PREFERRED EMBODIMENTS

Figure 1:
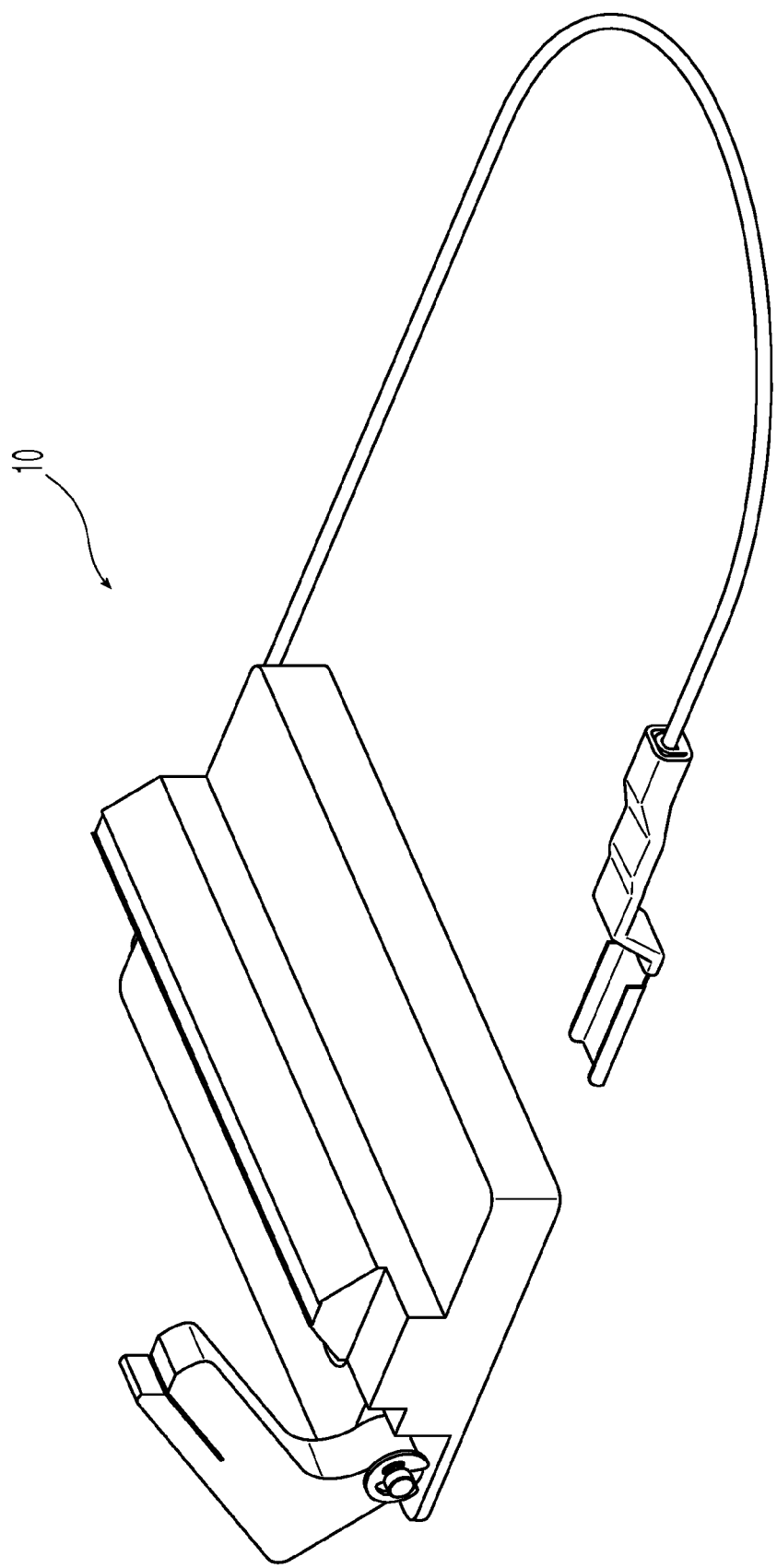
FIG. 1 is a top perspective view of a prior art ribbonizing tool.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a prior art ribbonizer 10 is illustrated. The ribbonizer 10 is used to group loose optical fibers (whether all optical fibers are loose or they are in a jacketed fiber optic cable) in a ribbon format so the optical fibers can be installed in an optical ferrule. In the prior art ribbonization tool, the fibers are temporarily held together in a slot. While the fibers are held together in the tool, tape or adhesive is applied to the fibers to create a ribbon. However, once the optical fibers are ribbonized, they need to be transferred to other devices for stripping and cleaving. All of this handling can affect the optical fibers, their integrity and the quality of the ribbonizing.

Figure 2:
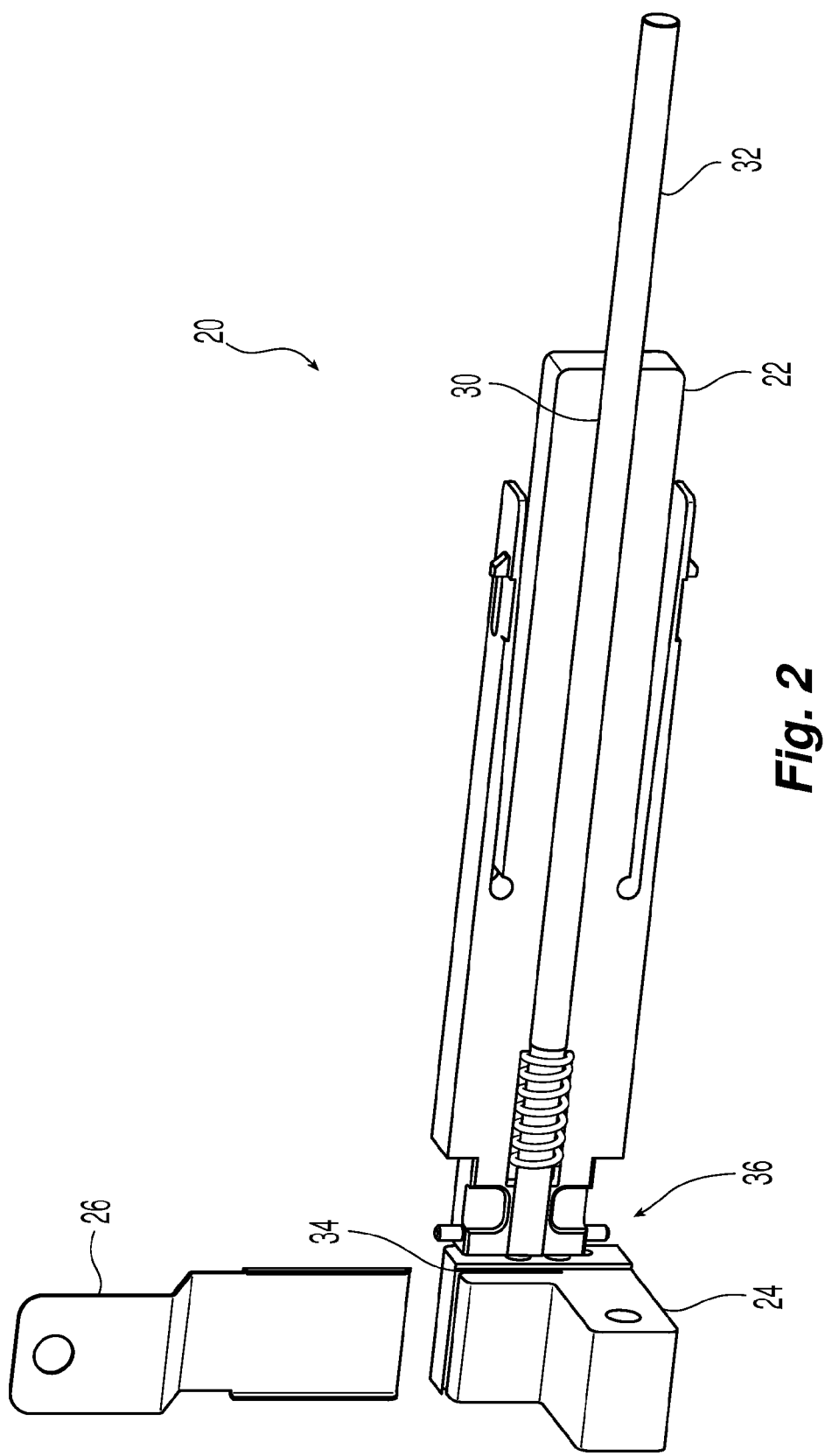
FIG. 2 is a side perspective view of a fiber clip according to one embodiment of the present invention.
Figure 3:
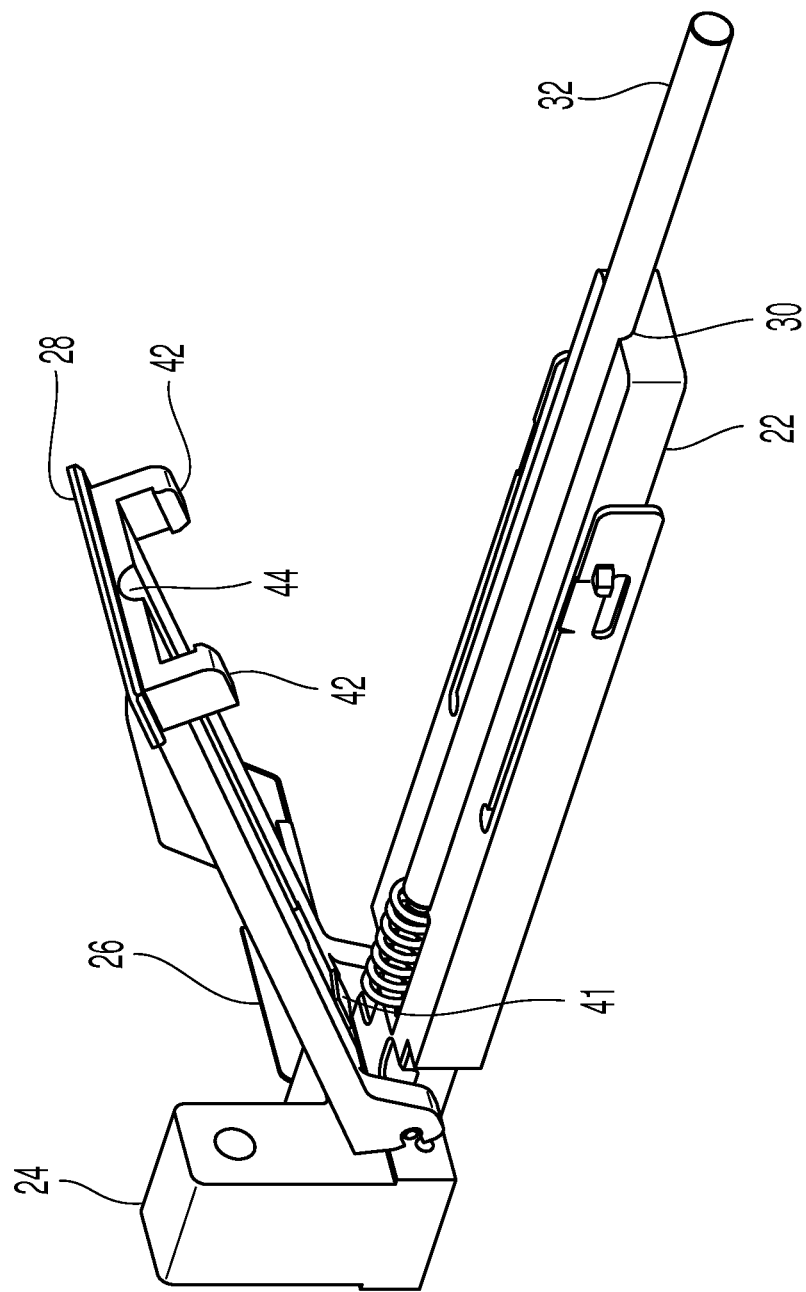
FIG. 3 is a side perspective view of the fiber clip of FIG. 1 after it has been rotated 90 degrees and a lid having been attached.

FIG. 2 illustrates a fiber clip 20 according to a first embodiment of the present invention. The fiber clip 20 has a base member 22, a stacker block 24, a stacker tool 26, and a lid 28 (FIG. 3). The base member 22 has a groove 30 into which optical fibers 32 are disposed. As noted above, the optical fibers 32 may generally be in any configuration. The optical fibers 32 preferably have a connector spring for the connector into which the optical fibers 32 are to be installed (an MTP connector spring is illustrated in FIG. 2). Ends of the optical fibers 32 are disposed into a precision slot 34 in the stacker block 24, which is attached to a first end 36 of the base member 22. Preferably, there are pins 38 extending from the stacker block 24 that frictionally engage openings 40 in the base member 22. See FIG. 4. With the optical fibers 32 in the slot 34, the stacker tool 26 is inserted into the slot to push the ends of the optical fibers 32 together. The bottom of the precision slot 34 is in alignment with the slot 30 of the base member 22 to ensure that the ends of the optical fibers 32 are in alignment with the rest of the optical fibers 32 so that there is no kinking or bending of the optical fibers 32 and that they are straight.

With the stacker tool 26 still compressing the optical fibers 32, the lid 28 is attached to the base member 22, as illustrated in FIG. 3. The lid 28 is rotatably disposed on the base member 22 and has an elastic pad 41 that compresses and holds the optical fibers 32 against the base member 22 and prevents them from moving relative to one another. The lid 28 may have latches 42 that engage corresponding structures on the base member 22. The lid 28 may also have a groove 44 corresponding to the optical fibers 32. It should be noted that while a groove 44 is shown in both the base member 22 and the lid 28, the groove may be in only one of the two and still fall within the scope of the present invention. Once the lid 28 has been secured to the base member 22, the optical fibers 32 cannot move relative to one another and the stacker tool 26 can be removed and the stacker block 24 can be separated from the base member 22 as shown in FIG. 4. The clip 20 can then be used to finalize the optical fibers 32 as described in more detail below.

Figure 5:
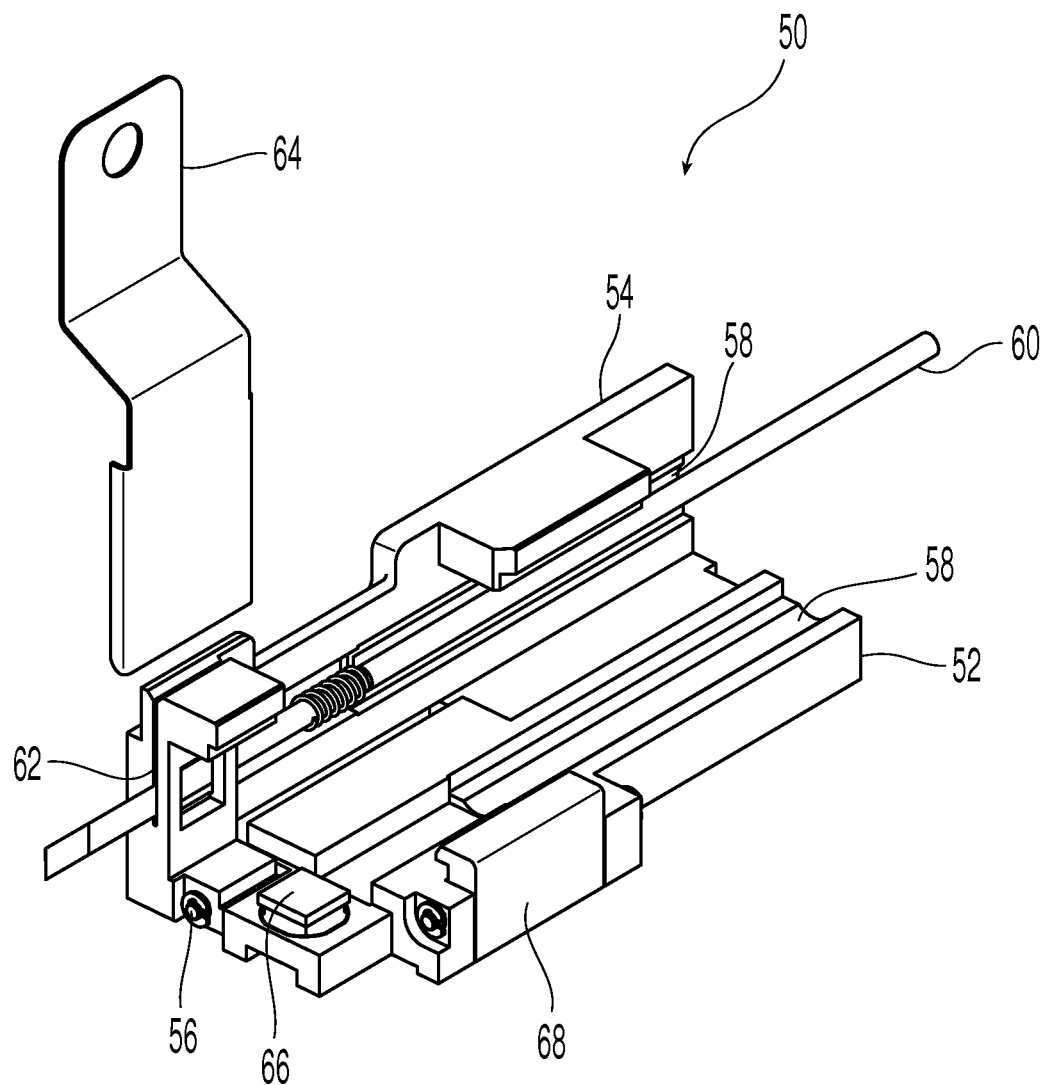
FIG. 5 is a top perspective view of a fiber clip according to a second embodiment of the present invention.

FIG. 5 illustrates another embodiment of a clip 50 according to the present invention. The clip 50 has a base member 52 and a lid 54 rotatably attached along one side 56. The base member 52 and the lid 54 both have a groove 58 for the optical fibers 60. Lid 54 has a precision slot 62 to align the optical fibers 60. The optical fibers 60 are disposed in the slot 62 and the stacker tool 64 compresses the optical fibers 60 against one another in the slot 62. The lid 54 is then closed and secured against the base member 52 and pad 66 with the latch 68. The stacker tool 64 is then removed and the clip 50 can be used to further process the optical fibers 60.

Figure 6:
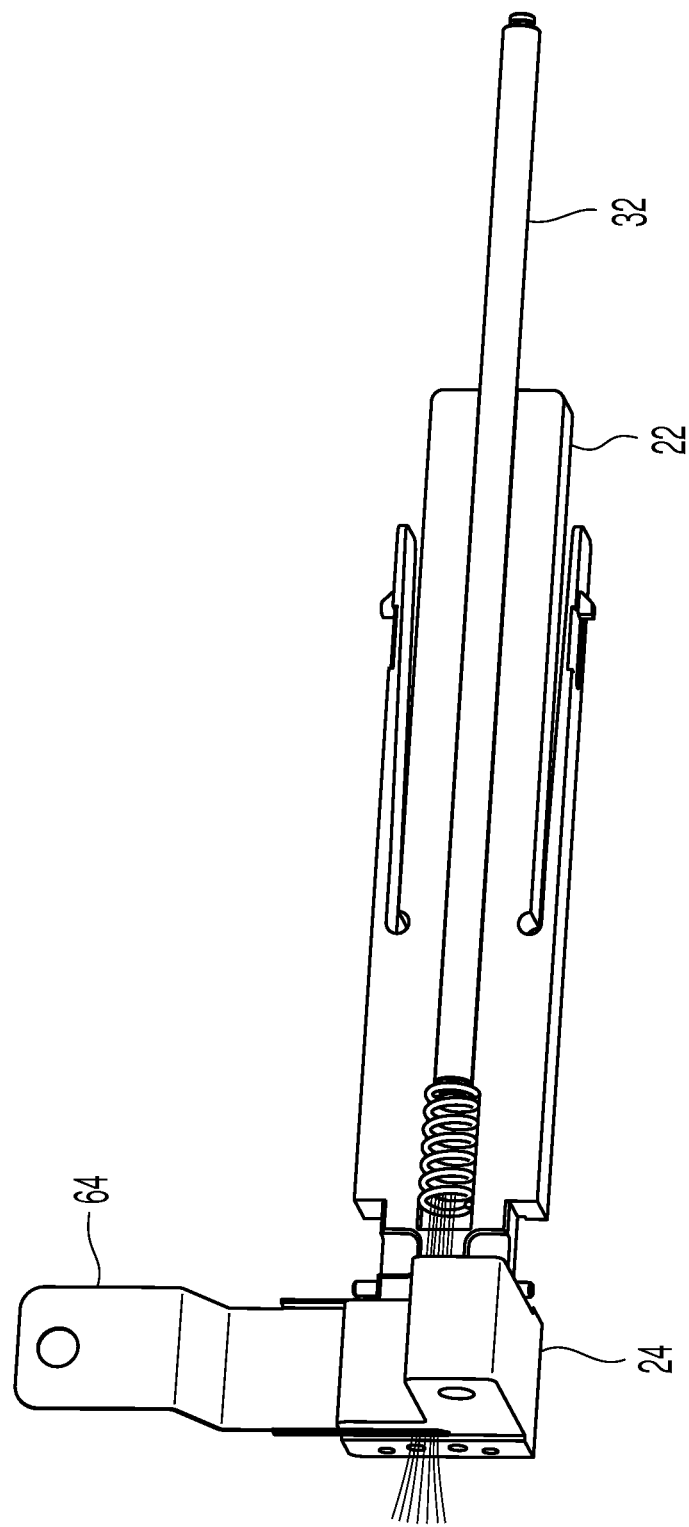
FIG. 6 illustrates a a portion of jacketed fiber optic cable positioned in the base, the optical fibers in the slot of the stacker block and pressed together with the stacker tool.
Figure 7:
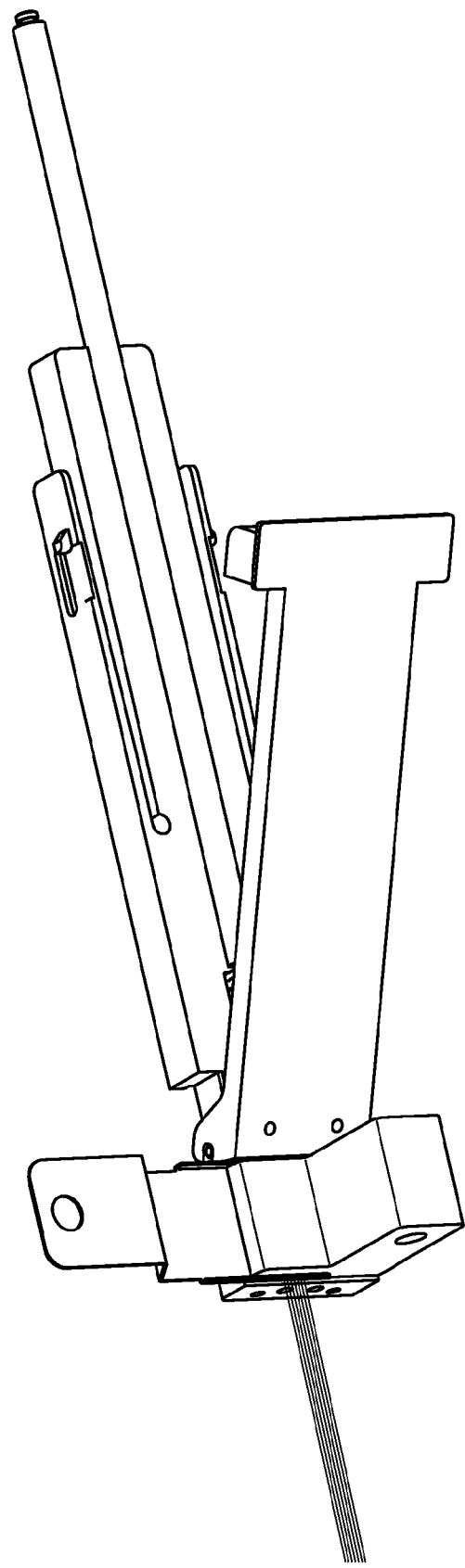
FIG. 7 illustrates the lid being disposed on the base.
Figure 8:
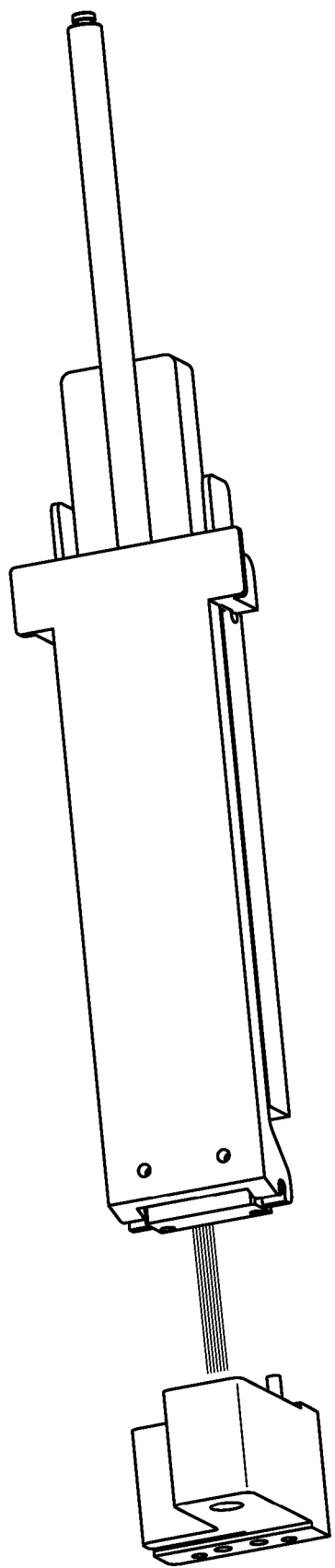
FIG. 8 illustrates that the stacker tool is removed and the base separated from the stacker block after the lid is closed and locks the optical fibers in place.

The method of preparing the optical fibers for insertion into an optical connector/ferrule will now be described in conjunction with FIGS. 6-11. In FIGS. 6-8, a clip is used that is the same as that described in detail above and illustrated in FIGS. 2-4. For clarity, the element numerals have not been included in this discussion.

As illustrated in FIG. 6, the optical fibers are in a jacketed fiber optic cable and the jacket and excess kevlar has been removed to expose the optical fibers. The loose optical fibers have been inserted into the precision slot and the optical fibers and cable placed in the groove in the base member. The stacker tool has been inserted into the precision slot to compress the optical fibers against one another and align them.

FIG. 7 illustrates the attaching of the lid onto the base member with a pin at the front of the base member engaging corresponding openings on the lid. The lid is then secured to the base and the stacking tool is removed.

FIG. 8 shows the stacking block being removed from the base (and the pins that engage openings on the base member to hold the two members together are visible). The aligned optical fibers are shown extending from the front of the clip.

The clip and optical fibers are then placed into a fiber optic stripper to strip the covering from the optical fibers as is known in the art. It is important that the optical fibers do not move relative to one another during this process and the elastic pad in the lid of the clip secures the optical fibers in the clip—using about 3 pounds of force.

The clip and optical fibers can be inserted into a cleaving device that cleaves the optical fibers at the correct location for insertion into a fiber optic ferrule connector. In fact, after cleaving the optical fibers, the clip and optical fibers can be inserted into another device to insert the optical fibers into a ferrule, all without having to ribbonize the optical fibers.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A clip for aligning at least four optical fibers for insertion into an fiber optic ferrule comprising:
    a base member to receive the at least four optical fibers;
    a lid connectable to the base member, the lid having an elastic pad to engage and secure the at least four optical fibers between the base member and the lid; and
    a stacker block having a slot to receive the at least four optical fibers disposed in the base member adjacent ends thereof, the slot having a width to align the at least four optical fibers in a linear array adjacent to one another.

2. The clip according to claim 1, wherein the base member has a groove to received at least a portion of the optical fibers.

3. The clip according to claim 1, wherein the lid is rotatably connected to the base member.

4. The clip according to claim 1, wherein the lid rotates about an axis parallel to the optical fibers.

5. The clip according to claim 1, wherein the lid rotates about an axis orthogonal to the optical fibers.

6. The clip according to claim 1, wherein the lid has a groove extending along at least a portion of its length to engage at least a portion of the optical fibers, the groove in the lid and the elastic pad being at different locations along the length of the lid.

7. The clip according to claim 1, wherein the stacker block is removably connected to the base member.

8. The clip according to claim 1, wherein the groove in the base member accommodates a spring installed on the optical fibers.

9. A method of preparing at least four optical fibers to be inserted into a fiber optic ferrule without ribbonizing the at least four optical fibers comprising:
    assembling the at least four loose optical fibers;
    holding the at least four optical fibers in an organized array adjacent one another at ends thereof; and
    inserting the ends of the organized array of the at least four optical fibers into the fiber optic ferrule.

10. The method according to claim 9, wherein the holding of the at least four optical fibers is performed by a clip that comprises a base member to receive the at least four optical fibers, a lid connectable to the base member, the lid having an elastic pad to engage and secure the at least four optical fibers between the base member and the lid, a stacker block having a slot to receive the at least four optical fibers disposed in the base member adjacent the ends thereof, the slot having a width to align the at least four optical fibers adjacent to one another.

11. The method according to claim 9, wherein the holding of the plurality of at least four optical fibers further comprises: disposing the at least four optical fibers in a groove in a base member; inserting ends of the at least four optical fibers in a slot in a stacker block; positioning the ends of the at least four the optical fibers adjacent to one another in the stacker block; and securing a lid to the base member, the lid having an elastic member to bias the at least four optical fibers against the base member.

12. The method according to claim 9, further comprising the steps of:
    stripping a covering off of the at least four optical fibers; and
    cleaving the stripped at least four optical fibers at a predetermined location for insertion into an optical ferrule.

13. A clip for aligning at least four coated optical fibers for insertion into an fiber optic ferrule after removing the optical coating comprising:
    a base member to receive the at least four coated optical fibers;
    a lid connectable to the base member, the lid having an elastic pad to engage and secure the at least four coated optical fibers between the base member and the lid; and a stacker block having a slot to receive the at least four coated optical fibers disposed in the base member adjacent ends thereof, the slot having a width to align the at least four coated optical fibers adjacent to one another.

14. The clip according to claim 13, wherein the base member has a groove to received at least a portion of the optical fibers.

15. The clip according to claim 13, wherein the lid is rotatably connected to the base member.

16. The clip according to claim 13, wherein the lid rotates about an axis parallel to the optical fibers.

17. The clip according to claim 13, wherein the lid rotates about an axis orthogonal to the optical fibers.

18. The clip according to claim 13, wherein the lid has a groove extending along at least a portion of its length to engage at least a portion of the optical fibers, the groove in the lid and the elastic pad being at different locations along the length of the lid.

19. The clip according to claim 13, wherein the stacker block is removably connected to the base member.

* * * * *

UNITED STATES PATENT AND TRADEMARK OFFICE
CERTIFICATE OF CORRECTION

PATENT NO. : 8,485,735 B2
APPLICATION NO. : 12/642767
DATED : July 16, 2013
INVENTOR(S) : Childers et al.

Page 1 of 1

It is certified that error appears in the above-identified patent and that said Letters Patent is hereby corrected as shown below:

IN THE CLAIMS

Column 4, line 8 (Claim 1, line 10), delete the text "adjacent to one another".

Signed and Sealed this
Third Day of September, 2013

Teresa Stanek Rea
*Acting Director of the United States Patent and Trademark Office*